US009260277B2

(12) United States Patent
Simula et al.

(10) Patent No.: US 9,260,277 B2
(45) Date of Patent: Feb. 16, 2016

(54) FORESTRY WINCH SYSTEM (71) Applicant: GSE Technologies, LLC, Houghton, MI (US)

(72) Inventors: Glen Raymond Simula, Hancock, MI (US); James A. Bertino, Wyandotte, MI (US)

(73) Assignee: GSE TECHNOLOGIES, LLC, Houghton, MI (US)

( * ) Notice: Subject to any disclaimer, the term of this patent is extended or adjusted under 35 U.S.C. 154(b) by 285 days.

(21) Appl. No.: 13/897,742

(22) Filed: May 20, 2013

(65) Prior Publication Data

US 2014/0341696 A1 Nov. 20, 2014

(51) Int. Cl.
| | |
|---|---|
| *B66D 1/26* | (2006.01) |
| *B66D 1/14* | (2006.01) |
| *A01G 23/099* | (2006.01) |
| *B66D 3/00* | (2006.01) |

(52) U.S. Cl.
CPC ............... *B66D 1/14* (2013.01); *A01G 23/099* (2013.01); *B66D 3/006* (2013.01)

(58) Field of Classification Search
CPC .............. B66D 1/14; B66D 1/24; B66D 1/26; B66D 1/365; B66D 3/006; B66D 3/20; A01G 23/0955; A01G 23/097; B27L 1/06
See application file for complete search history.

(56) References Cited

U.S. PATENT DOCUMENTS

| | | | |
|---|---|---|---|
| 2,450,718 A * | 10/1948 | Darnell ........................ | 414/756 |
| 3,985,047 A * | 10/1976 | Therkelsen ................... | 254/354 |
| 4,426,064 A * | 1/1984 | Healy ........................... | 254/342 |
| 4,854,547 A | 8/1989 | Oliphant | |
| 5,507,471 A * | 4/1996 | Mercurio ...................... | 254/214 |
| 6,241,215 B1 | 6/2001 | Gersemsky et al. | |
| 6,422,538 B1 | 7/2002 | Rumfield | |
| 6,474,377 B1 * | 11/2002 | Van De Mortel .......... | 144/24.13 |
| 6,578,823 B1 * | 6/2003 | Johnson ....................... | 254/334 |
| 6,705,597 B1 | 3/2004 | Reilly et al. | |

(Continued)

FOREIGN PATENT DOCUMENTS

| | | |
|---|---|---|
| AU | 2010202945 A1 | 7/2010 |
| JP | 7232899 A | 9/1995 |

OTHER PUBLICATIONS

International Search Report and Written Opinion; International application No. PCT/US2014/031205; date of mailing Jul. 21, 2014.

(Continued)

*Primary Examiner* — Emmanuel M Marcelo
(74) *Attorney, Agent, or Firm* — Brooks Kushman P.C.

(57) ABSTRACT

A winch system 10 coupled to a processor energy source 12 having multiple processor driving rollers 14. The processor 12 provides energy to the winch system 10. The winch system has a body 18 with a front face 20, a back face 22, lateral sides 24, a top 26, a bottom 28 and an imaginary vertical axis A-A. Multiple driven winch drive rollers 32 are supported by the body 18 so that they are rotatable about axes that are parallel to the vertical axis in response to the multiple processor driving rollers. A winch drum 36 is attached to the body 18. A drum gear 38 influences the speed and direction of winch drum rotation. Attached to the winch drum is a cable 40 having a proximal end 42 region and a distal end region that is detachably attachable to an object 46 to be retrieved by the winch system. The cable extends outwardly from the front 20 or back faces 22 of the body 18.

16 Claims, 9 Drawing Sheets

(56) References Cited

U.S. PATENT DOCUMENTS

| | | |
|---|---|---|
| 7,478,795 B2 | 1/2009 | Grapes et al. |
| 7,909,308 B2 | 3/2011 | Lauder et al. |
| 2009/0308826 A1* | 12/2009 | Kempf ......................... 212/270 |
| 2011/0079760 A1 | 4/2011 | Kempf |

OTHER PUBLICATIONS

International Preliminary Report on Patentability; related International application No. PCT/US2014/031205; date of issuance of report Nov. 24, 2015.

* cited by examiner

FORESTRY WINCH SYSTEM

TECHNICAL FIELD

BACKGROUND (1) Field of the Invention

The present disclosure relates to a winch system coupled to a processor that energizes the winch system, usually in a forestry environment.

(2) Related Art

Particularly in the lumber business, it is known that there are challenges imposed by remote locations, hard-to-reach job sites, the size and weight of trees to be felled and the movement after felling of heavy, unstable trees and limbs. To meet such challenges, machinery has been developed that deploy tree and limb processors. Examples include equipment made by Waratah, such as the HTH625C harvester head—http://www.waratah.net.

The following patent numbers were considered before filing this patent application: JP 7232899; AU 2010/202945; U.S. Pat. Nos. 6,705,597; and 5,386,970.

SUMMARY

One embodiment of the present disclosure includes a winch system by which the disclosed method is practiced.

The disclosure also includes a method for ensnaring an object such as a tree limb before it is felled to influence the direction in which it is to fall or after it is felled and pulling it toward a processor that de-limbs or prunes and optionally cuts the limb to length.

DETAILED DESCRIPTION

Figure 1:
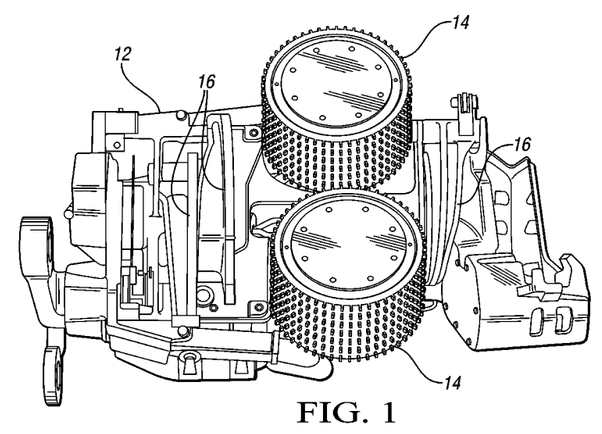
FIG. 1 is a perspective view of a processor with which a winch system as disclosed herein operates.

A winch system 10 (FIGS. 1-2) is coupled to a processor energy source 12 having multiple processor driving rollers 14 and optionally crab claw-like knives 16. The processor 12 provides energy to the winch system 10 through driving rollers 14 that optionally are reversible. The winch system 10 has a body 18 (FIG. 2) with a front face 20, a back face 22, lateral sides 24, a top 26, a bottom 28 and an imaginary vertical axis (A-A). Multiple driven winch drive rollers 32 (preferably two) are supported between the top 26 and bottom 28 so that they are rotatable about axes that are parallel to the vertical axis (A-A) in response to the multiple processor driving rollers 14.

Figure 4:
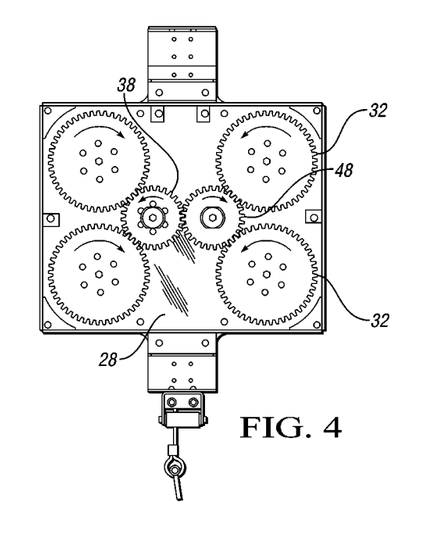
FIG. 4 illustrates a gear train of the winch system with a cover removed.
Figure 5:
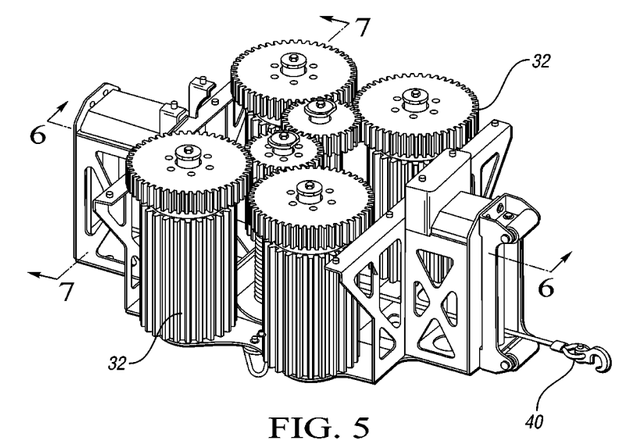
FIG. 5 is a quartering perspective view of the gear train, again with a case removed.
Figure 6:
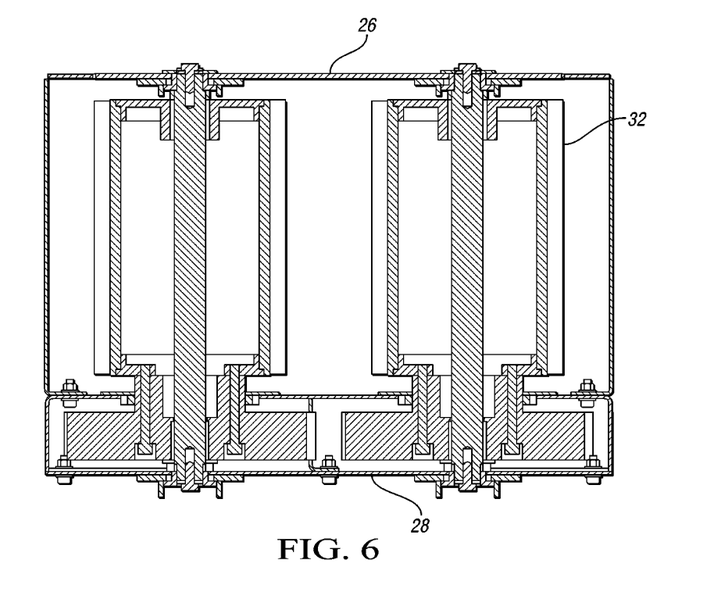
FIG. 6 is a sectional view taken along the line VI-VI of FIG. 5.
Figure 7:
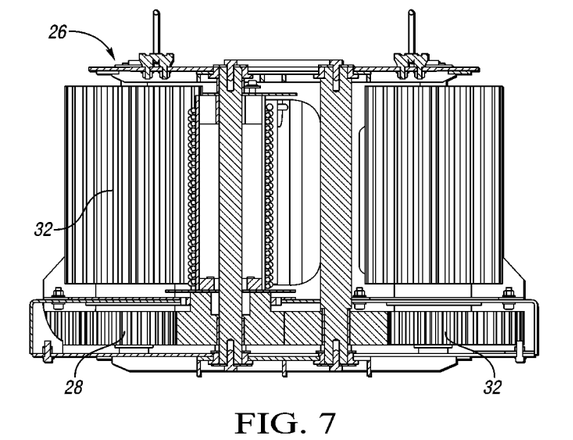
FIG. 7 is a sectional view taken along the line VII-VII of FIG. 5.
Figure 8:
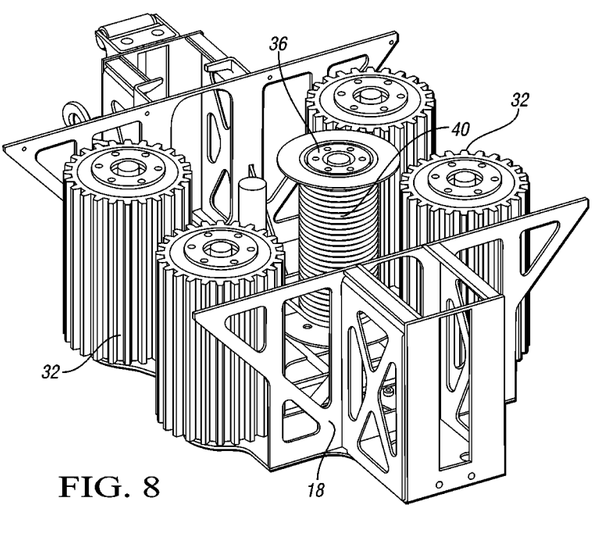
FIG. 8 is a quartering perspective view of those parts of the winch system that underlie the gears.
Figure 9:
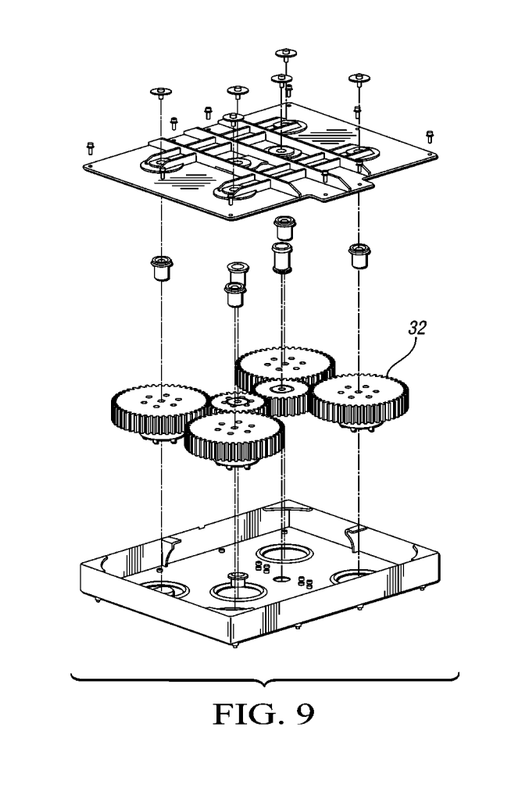
FIG. 9 is an exploded view of one embodiment of the gear box used in the winch system.
Figure 10:
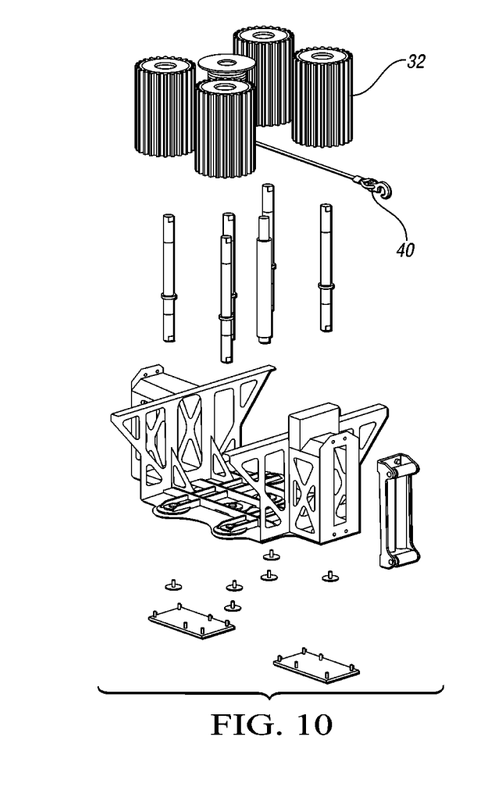
FIG. 10 is a plan view of the base of the winch system.
Figure 11:
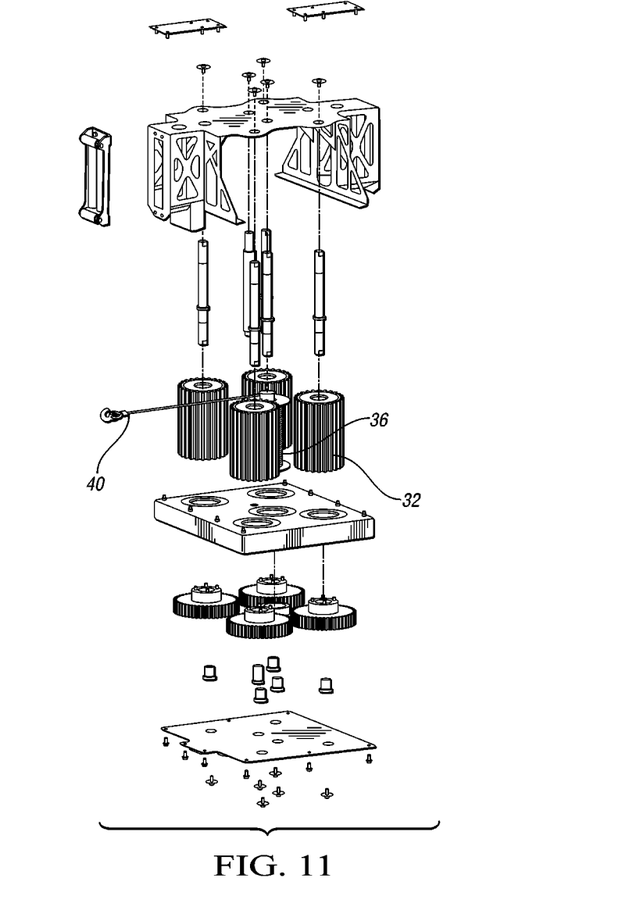
FIG. 11 is an exploded view of the winch system.

A winch drum 36 (FIG. 8) is supported by the body 18. Associated with the winch drum 36 is a drum gear 38 (FIG. 4) that influences the speed and direction of winch drum 36 rotation. A cable 40 extends from or wraps around the winch drum 36. The cable 40 has a proximal end 42 region (FIG. 15) attached to the winch drum 36 and a distal end region 44 that is detachably attachable to an object 46 to be retrieved by and pulled or hauled towards the winch system 36. The cable 40 extends outwardly from the front 20 or back 22 faces of the body 18.

A reverse gear 48 (FIG. 4) is mounted so that it rotates with the driven winch drive rollers 32 in a plane that lies perpendicularly to the vertical axis A-A.

In one embodiment, the multiple processor driving rollers 14 of the processor energy source 12 include two processor driving rollers 14. Preferably, the multiple driven winch drive rollers 32 of the winch system 10 comprise four rollers.

Figure 2:
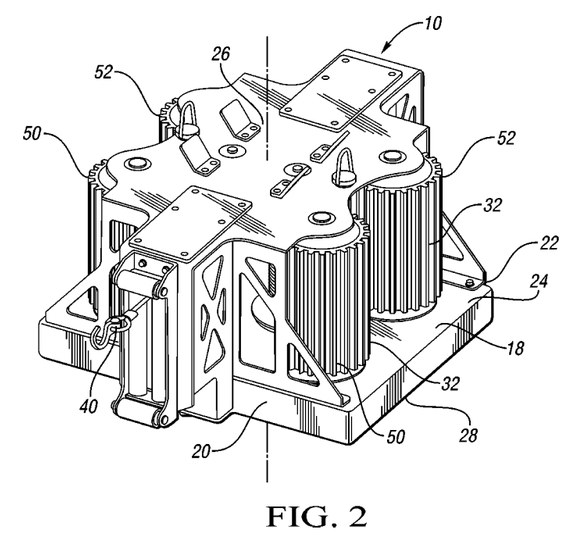
FIG. 2 is a view of the winch system illustrating a side thereof that interfaces with the processor of FIG. 1.
Figure 3:
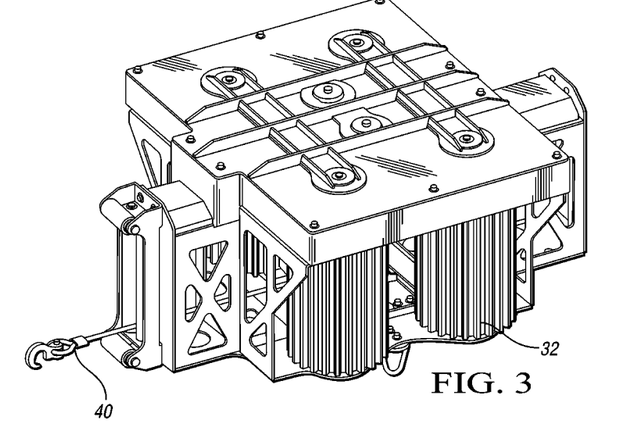
FIG. 3 is a bottom view of the winch system.

As seen in FIG. 2, where there are four driven rollers, two rollers 50 are mounted adjacent the front face 20 of the winch system 10 and two rollers 52 are mounted adjacent the back face 22 of the winch system 10. In such a case, the reverse gear 48 intermeshes between the front two 50 winch system gears.

Preferably the cable 40 extends from the body 18 between the front two driven rollers 50.

In use, the disclosed apparatus for ensnaring and retrieving objects 46 comprises in combination a winch system 10, as described above and a processor energy source 12 to which the winch system 10 is coupled. The processor energy source 12 has multiple processor driving rollers 14 and some embodiments have crab claw-like knives 16.

As used herein the term "winch" connotes a mechanical device that is used to pull in (wind up) or let out (wind out) or otherwise adjust the "tension" of a rope or wire rope (also called a "cable" or "wire cable"). En.wikipedia.org/wiki/Winch. In its simplest form, it consists of a spool and an attached hand crank. Id. The spool can also be called the winch drum. Id. Some designs have gear assemblies and can be powered by electric, hydraulic, pneumatic or internal combustion drives. Id. Some may include a solenoid brake and/or a mechanical brake or ratchet and pawl device that prevents it from unwinding unless the pawl is retracted.

Figure 12:
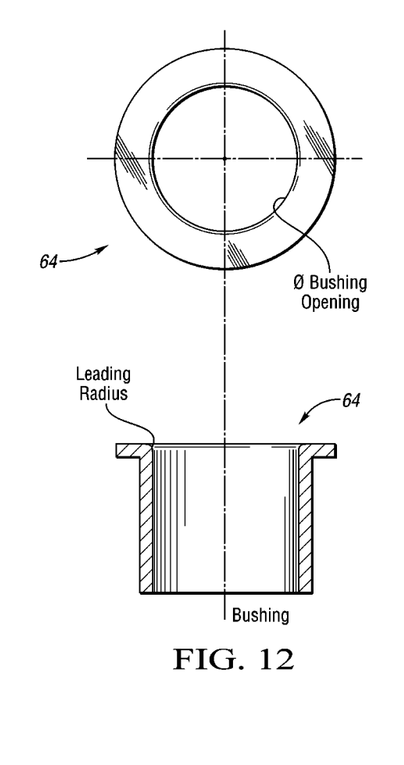
FIG. 12 illustrates one way in which the processor can be aligned or registered with the winch system.
Figure 13:
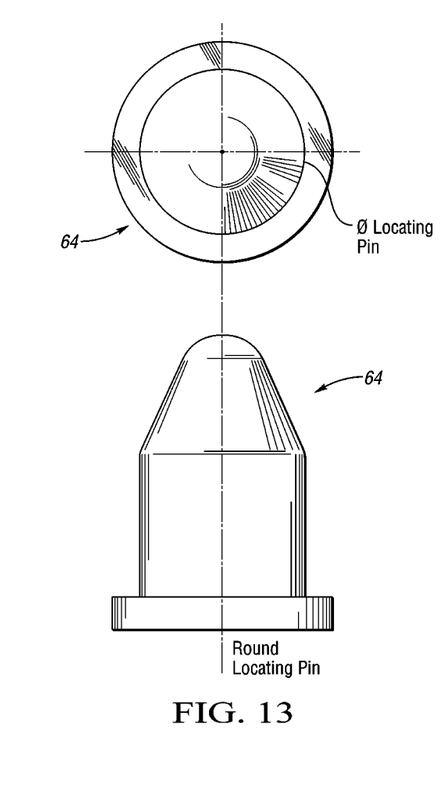
FIG. 13 is an alternate embodiment of a registration system.
Figure 14:
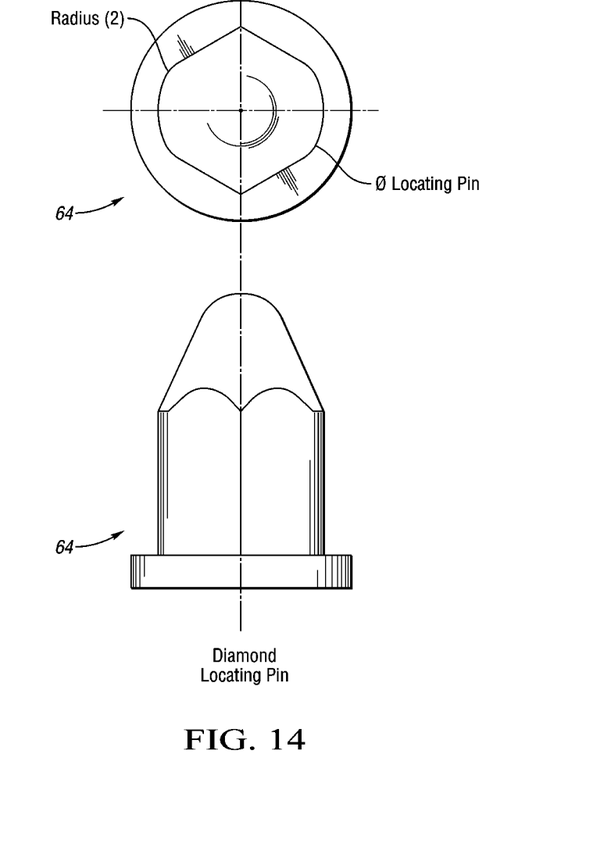
FIG. 14 is a further alternative embodiment of a registration system.

In use, one method for operating the winch system 10 involves the processor 12 descending from above and engaging the winch system 10 (FIGS. 12-14). After engagement, the winch system 10 is coupled to the movable processor 12.

One embodiment of the processor 12 has a pair of processor driving rollers 14 (FIG. 1) and openable claw-like knives 16. Via a gearing system to be described, the processor 12 provides rotational, translational and potential energy to the winch system 10. The gearing system (FIG. 4) rotates, stops or reverses the rotation of a drum 36 (FIG. 8) around which the cable 40 is wrapped and to which the cable 40 is tethered so that the cable 40 can be extended or retracted without detachment or slippage.

In use, the distal end 58 of the cable is detachably attached to an object 46 to which a pulling force is to be applied. The proximal end 56 is secured to the drum.

One way of operating the disclosed apparatus involves these steps, not all of which need to be practiced, nor in the sequence set forth:

A. lowering the processor 12 and the pair of driving rollers 14 over the winch system 10;

B. engaging the processor driving rollers 14 with the driven winch drive rollers 32 so that in one embodiment each processor driving roller 14 engages two winch driven rollers (e.g. 50 or 52);

C. securing the distal end 56 of the cable 40 to or around an object 46 to be pulled;

D. rotating the processor driving rollers 14 and the driven winch drive rollers 32 and drum 36 to apply tension to and pull in the cable 40 and the ensnared object 46 so that the object 46 may be retrieved or the direction in which it may fall is influenced.

Other steps may be involved:

E. straddling the object 46 with the claw-like knife 16; and

F. removing unwanted appendages (e.g. limbs) from the object 46 as it is retrieved by the cable 40 and passes through the knife 16.

Figure 15:
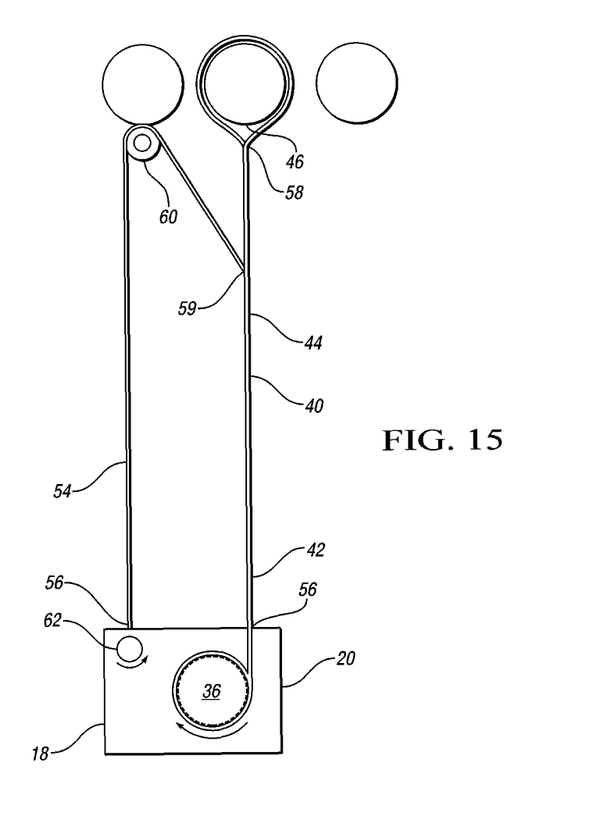
FIG. 15 is a schematic illustration of a long lining system for deploying a cable associated with the winching system from a cable retracted position toward a cable extended position in which it engages an object to be moved or retrieved.

FIG. 15 illustrates one form of a long lining subsystem that includes a long lining winch 62. The long lining subsystem deploys a light line 54. The proximal end 56 of the light line 54 is attached to the winch system 10. A distal end 59 of the light line 54 is attached to the distal end region 44 of the cable 40 proximate its end 58. The light line 54 extends over a pulley 60 that is located proximate to the object 46 to be retrieved. A long lining winch 62 is attached to the winch system 10.

In use, after the cable 40 retrieves the object 46, the distal end 59 of the light line 54 is attached close to the distal end 58 of the cable before or after the light line 54 is led over the pulley 60. The ancillary winch 62 is then rotated in such a way that tension is applied to the light line 54 which is hauled in and wraps around a drum associated with the ancillary winch 62. Deployment forces are then exerted by the distal end of the light line 59 as it urges the cable 40 outwardly from the main winch drum 36 toward an object 46 to which the cable 40 is to be secured.

In use, the light line could be separated from or remain attached to the cable 40 as it is hauled in by the main winch drum 36.

In one example, the pitch diameter of the driving winch rollers 32 was 11.5 inches; that of the reverse gear 48 was 6 inches; and that of the drum 38 was 7 inches. It was observed that the torque on each driven winch drive roller was about 940 lbs and the resulting torque on the drum was about 2200 foot pounds. When the driven winch drive rollers rotated at about 21 rpm, this resulted in the drum rotating at about 34.6 rpm and the energy transferred was about 14.3 horsepower.

In practice, the processor driving rollers 14 are preferably hydraulically driven. When a log is inserted between the rollers 14, it is propelled through the knives for limb removal. Optionally, the limb can also be cut.

In another embodiment, there are two driven rollers 32 which will provide power to the winch drive 36. This embodiment eliminates the cost of the two additional rollers plus the associated gears.

A further embodiment uses a single processor driving roller located at the bottom of the processor 12 that would drive a single gear 32 which would drive the winch drive hub 36.

A yet further embodiment would use a single processor driving hub to drive a hydraulic motor. Then a hydraulic hose could be routed from the hydraulic motor to the driving hub to provide power to the winch 36. This hydraulic mechanism would allow the drive winch 36 to be positioned in alternate locations and a hydraulic hose to be connected to it instead of gears.

In order to ensure that the forestry processor 12 aligns properly with the winch 10, it is suggested that an optional alignment mechanism 64 be integrated into the system (FIGS. 12-14).

A first embodiment of the alignment mechanism 64 would incorporate slots or recesses into the winch, which would be used as guides for the knives of the processor. When transitioning from the open to the closed position, the knives of the processor would engage the guiding slots, ensuring that the position of the winch relative to the processor is the same every time the winch is in use.

Another embodiment of the alignment mechanism would utilize two locating pins in conjunction with two bushings. Both pins would be fixed to the processor 12 and both of the bushings would be fixed to the winch 10. The spacing between the locators on the processor 12 would be the same as the spacing between the bushings on the winch 10. When the processor is lowered, the pins would engage the openings on the bushing and properly guide the processor 12 into the correct position over the winch 10. The bushings would include a leading radius which would correct any small misalignments while the processor 12 is being lowered. It would also be possible to switch the positions of the locating components and fix the bushings to the processor 12 and the pins to the winch 10.

If the tolerance for misalignment is low, the openings of the bushings should have diameters that are only slightly larger than the diameters of the locating pins. On the other hand, if the tolerance for misalignment is high, there may be a larger variance in the diameters of the bushing openings and the diameters of the locating pins.

It is further suggested that a round locating pin be used in conjunction with a diamond-shaped locating pin. This ensures tight dimensioning in one direction and slight play in a second direction. The allowance of slight play in one direction prevents binding of the locating pins with the bushings, while at the same time ensuring proper alignment.

If the tolerance for misalignment is low, it is further suggested that the locator pins and bushings be placed in such way that would restrict deviation of the line created by the intersection of the center point of the two drive rollers on the processor from the center points of the two lines created by the intersection of the center points of each set of drive rollers on the winch that are driven by the same drive roller on the processor.

In addition to the alignment mechanism, it is also possible to incorporate a latching mechanism that would prevent use of the winch 10 unless the processor 12 is properly aligned. The latching mechanism would be released when the knives are in place in the first embodiment or when the locating pins are in place in the second embodiment.

In place of a latching mechanism, it is also possible to incorporate mechanical or proximity switches to prevent the processor from running by cutting off its power source unless it is properly aligned to the winch.

The benefits from adding an alignment mechanism would include but are not limited to: (1) ensuring proper alignment whenever the winch is in use; (2) ensuring the winch is properly orientated relative to the processor; and (3) ensuring proper engagement of the driven winch drive rollers 32 with the processor drive rollers 14, which would in turn eliminate any undesired forces or bending moments that could potentially increase the rate of wear on the moving parts or cause mechanical failure (e.g., fracturing of the gear shafts).

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

| Reference No. | Component |
| --- | --- |
| 10 | Winch system |
| 12 | Processor energy source |
| 14 | Processor driving rollers |
| 16 | Crab claw-like knives |
| 18 | Body |
| 20 | Front face |
| 22 | Back face |
| 24 | Lateral sides |
| 26 | Top |
| 28 | Bottom |
| A-A | Imaginary vertical axis |
| 32 | Driven winch drive rollers |
| 36 | Winch drum |
| 38 | Drum gear |
| 40 | Cable |
| 42 | Proximal end region |
| 44 | Distal end region |
| 46 | Object to be retrieved |
| 48 | Reverse gear |
| 50 | Two rollers mounted adjacent the front face |
| 52 | Two rollers mounted adjacent the back face |
| 54 | Light line |
| 56 | Proximal end |
| 59 | Distal end |
| 60 | Pulley |
| 62 | Ancillary long lining winch |
| 64 | Alignment mechanism |

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A winch system coupled to a processor energy source having multiple processor driving rollers, the processor providing energy to the winch system, the winch system comprising
    a body having a front face, a back face, lateral sides, a top, a bottom and an imaginary vertical axis, the body being detachable from the processor energy source;
    multiple drive rollers that are directly driven by the multiple processor driving rollers, the drive rollers being supported between the top and the bottom of the body so that they are rotatable about axes that are parallel to the vertical axis in response to the multiple processor driving rollers;
    a winch drum supported by the body;
    a drum gear that influences the speed and direction of winch drum rotation;
    a cable having a proximal end region attached to the winch drum and a distal end region that is detachably attachable to an object to be retrieved by the winch system, the cable extending outwardly from the front face or back face of the body; and
    a reverse gear that is mounted so that it rotates with two of the driven winch drive rollers in a plane that lies perpendicularly to the vertical axis.

2. The winch system of claim 1, wherein the multiple processor driving rollers of the processor energy source include two processor driving rollers.

3. The winch system of claim 1, wherein the multiple driven rollers of the winch system comprise four rollers.

4. The winch system of claim 3, wherein the four rollers include two rollers mounted adjacent the front face of the winch system and two rollers mounted adjacent the back face of the winch system.

5. The winch system of claim 4, wherein the reverse gear intermeshes between a front and a back roller.

6. The winch system of claim 5, wherein the cable extends from the body between the front two driven rollers.

7. The winch system of claim 5, wherein the cable extends from the body between the back two driven rollers.

8. A machine for ensnaring objects comprising in combination:
    a winch system; and
    a processor energy source to which the winch system is coupled, the processor energy source having multiple processor driving rollers and openable claw-like knives, the processor providing energy to the winch system,
    the winch system comprising
    a body having a front face, a back face, lateral sides, a top, a bottom and an imaginary vertical axis, the body being detachable from the processor energy source;
    multiple drive rollers that are directly driven by the multiple processor driving rollers, the drive rollers being supported between the top and the bottom of the body so that they are rotatable about axes that are parallel to the vertical axis in response to the multiple processor driving rollers;
    a winch drum attached to the body;
    a drum gear that influences the speed and direction of winch drum rotation;
    a cable having a proximal end region attached to the winch drum and a distal end region that is detachably attachable to an object to be retrieved by the winch system, the cable extending outwardly from the front face or back face of the body; and
    a reverse gear that is mounted so that it rotates two of the winch drive rollers in a plane that lies perpendicularly to the vertical axis.

9. The machine of claim 8, further including a long lining subsystem comprising:
    a light line with a proximal end anchored to the winch system and a distal end attached to the distal end region of the cable;
    a pulley located proximate to the object to be retrieved, the light line running over the pulley; and
    an ancillary long lining winch attached to the winch system.

10. The machine for ensnaring objects of claim 8, further comprising an alignment mechanism, the alignment mechanism having a first locating pin, a second locating pin, a first bushing, and second bushing, wherein the alignment mechanism ensures proper alignment of the multiple driving processor rollers with respect to the multiple winch rollers when the first and second locating pins are inserted respectively into the first and second bushings.

11. The machine for ensnaring objects of claim 10, wherein the first locating pin is a round locating pin and the second locating pin is a diamond-shaped locating pin.

12. The machine for ensnaring objects of claim 10, wherein the first and second locating pins are fixed to the processor and the first and second bushings are fixed to the winch system.

13. The machine for answering objects of claim 10, wherein the first and second locating pins are fixed to the winch system and the first and second bushings are fixed to the processor energy source.

14. A method for operating a winch system with a drum, the winch system being coupled to a movable processor having a pair of driving processor rollers and openable claw-like knives, the processor providing energy to the winch system that applies tension to a cable having a distal end that is detachably attached to an object against which a pulling force is to be applied and a proximal end that is secured to the drum, the winch system comprising:
   a body having lateral sides, a top and a bottom;
   multiple winch rollers that are driven by the driving processor rollers and supported between the top and bottom of the body; a reverse gear; and
   a drum gear that is connected to the winch drum, the method including the steps of:
   A. lowering the processor and the driving processor rollers over the winch system;
   B. engaging the driving processor rollers with the driven winch rollers so that each processor driving roller engages one or more winch driven rollers;
   C. securing the distal end of the cable around the object to be pulled;
   D. rotating the processor driving rollers and the driven winch rollers to apply tension to the cable and the object so that the object may be pulled or retrieved.

15. The method of claim 14, further comprising the step of:
   E. straddling the object with one of the openable claw-like knives;
   F. removing unwanted appendages from the object as it is retrieved by the cable and passes through the one openable claw-like knives.

16. A method for operating a winch system with a drum, the winch system being coupled to a movable processor having a pair of driving processor rollers and one or more openable claw-like knives, the processor providing energy to the winch system and to a cable having a distal end that is detachably attached to an object against which a pulling force is to be applied and a proximal end that is secured to the drum, the winch system comprising
   a body having lateral sides, a top and a bottom;
   multiple winch rollers that are driven by the driving processor rollers, the winch rollers being associated with the body;
   a reverse gear; and
   a drum gear that is connected to the winch drum, the method including the steps of:
   A. lowering the processor and the pair of driving processor rollers over the winch system;
   B. engaging the driving processor rollers with the driven winch rollers so that each driving processor roller engages two winch rollers;
   C. securing the distal end of the cable to the object to be pulled;
   D. rotating the processor driving rollers and the driven winch to apply tension to the cable and the object so that the object may be hauled in or retrieved.

* * * * *